US010961683B2

(12) United States Patent
Campbell

(10) Patent No.: US 10,961,683 B2
(45) Date of Patent: Mar. 30, 2021

(54) CABLE ARMORING SYSTEM

(71) Applicant: Richard V. Campbell, Havana, FL (US)

(72) Inventor: Richard V. Campbell, Havana, FL (US)

(*) Notice: Subject to any disclaimer, the term of this patent is extended or adjusted under 35 U.S.C. 154(b) by 119 days.

(21) Appl. No.: 15/715,470

(22) Filed: Sep. 26, 2017

(65) Prior Publication Data

US 2018/0087239 A1 Mar. 29, 2018

Related U.S. Application Data

(60) Provisional application No. 62/399,521, filed on Sep. 26, 2016.

(51) Int. Cl.
*E02F 3/58* (2006.01)
*F16G 11/02* (2006.01)
*E02F 3/46* (2006.01)
*E02F 3/48* (2006.01)
*F16G 11/04* (2006.01)
*E02F 9/14* (2006.01)

(52) U.S. Cl.
CPC .............. *E02F 3/58* (2013.01); *E02F 3/46* (2013.01); *E02F 3/48* (2013.01); *F16G 11/025* (2013.01); *F16G 11/042* (2013.01); *E02F 9/14* (2013.01)

(58) Field of Classification Search
CPC ........ F16G 11/025; F16G 11/00; F16G 11/02; E02F 9/14; E02F 3/46; E02F 3/48; E02F 3/14; E02F 3/60; E02F 3/58
See application file for complete search history.

(56) References Cited

U.S. PATENT DOCUMENTS

| | | | | |
|---|---|---|---|---|
| 1,121,736 A | * | 12/1914 | Lee et al. ................ | D03C 1/14 24/122.3 |
| 2,339,700 A | * | 1/1944 | Huston ................... | E02F 3/304 414/690 |
| 3,037,649 A | * | 6/1962 | Bauer ..................... | E02F 3/304 414/690 |
| 3,844,923 A | * | 10/1974 | Sandrock ............... | C25D 17/18 204/213 |
| 3,905,711 A | * | 9/1975 | Rogers .................. | F16G 11/048 24/115 M |
| 4,035,936 A | * | 7/1977 | Avara ..................... | E02F 3/30 37/396 |
| 4,085,854 A | * | 4/1978 | Baron ..................... | E02F 3/30 414/694 |
| 4,150,812 A | * | 4/1979 | Baron ..................... | E02F 3/30 254/393 |
| 5,469,647 A | * | 11/1995 | Profio ................... | E02F 3/4075 37/398 |
| 9,720,198 B2 | * | 8/2017 | Kuffel .................. | G02B 6/4471 |

(Continued)

*Primary Examiner* — Jessica H Lutz
(74) *Attorney, Agent, or Firm* — J. Wiley Horton

(57) ABSTRACT

A novel cable construction provides an armored covering over a cable containing high-strength synthetic filaments. The synthetic cable is provided with a strong and tough termination where it attaches to the prior art dragline or power shovel digging equipment. An external armoring is then provided from the termination for a specified distance up the cable. The armoring ceases prior to the point where the cable passes over a pulley. At that point the cable just carries a conventional encapsulating jacket. A collar is preferably provided to seal the end of the armoring portion to the jacket.

7 Claims, 7 Drawing Sheets

(56) References Cited

U.S. PATENT DOCUMENTS

| | | | |
|---|---|---|---|
| 2011/0101290 A1* | 5/2011 | Carlson | H02G 1/081 254/134.3 FT |
| 2012/0195729 A1* | 8/2012 | Hren | E02F 9/14 414/687 |
| 2015/0034891 A1* | 2/2015 | Carlson | H02G 1/081 254/134.3 R |
| 2016/0186407 A1* | 6/2016 | Campbell | E02F 3/48 |
| 2017/0096793 A1* | 4/2017 | Patenaude | D07B 1/005 |
| 2018/0320756 A1* | 11/2018 | Campbell | D07B 1/005 |

* cited by examiner

CABLE ARMORING SYSTEM

CROSS-REFERENCES TO RELATED APPLICATIONS

This non-provisional patent application, claims the benefit of an earlier-filed provisional application. The first provisional application was assigned Ser. No. 62/399,521.

STATEMENT REGARDING FEDERALLY SPONSORED RESEARCH OR DEVELOPMENT

Not applicable.

MICROFICHE APPENDIX

Not applicable

BACKGROUND OF THE INVENTION

1. Field of the Invention

This invention relates to the field of draglines and power shovels. More specifically, the invention comprises a novel cable construction that allows the use of high-strength synthetic filament cables as a replacement for prior art steel constructions.

2. Description of the Related Art

The present invention proposes to replace some of the chain and wire rope systems used in existing dragline and power shovel operations with high-strength synthetic filament cables. Synthetic filament cable are made of millions of very fine filaments. Each filament is typically smaller in diameter than a human hair. The strength-to-weight ratio of such filaments is much better than the ratio for steel wires. However, synthetic filaments are not very tough. They are quite susceptible to abrasion and cut damage. Thus, synthetic filament cables have not been commonly used in the very hostile environments found in dragline and power shovel operations (typically pit mines).

A prior art dragline bucket is shown in FIG. 1. Dragline bucket assembly 10 is lifted and positioned by a boom crane—typically a very large boom crane. Bucket 24 is nearly always made of thick steel. The width of the bucket's mouth may be as much as twenty feet (6 meters). The bucket itself often weighs many tons.

In operation, the bucket is swung into position and then dropped into the material that is to be removed. The mouth of the bucket is typically given a downward pitch during the drop operation so that it digs into the material. The bucket is then dragged back toward the boom crane. As it is dragged along the bucket's mouth scoops in a load of material. FIG. 1 shows the configuration of the dragline bucket assembly during a typical scooping phase.

Once the bucket is full the boom crane is used to pull the bucket assembly free of the material. The boom crane then swings the bucket toward the area where the scooped material is to be deposited. When the bucket assembly reaches the deposit area, a dumping mechanism causes the bucket to pitch downward. The contents of the bucket then spill from the bucket's mouth. Once the bucket is empty, the cycle repeats.

Bucket 24 and its contents are primarily suspended by a pair of lift trunnion assemblies 22—with a trunnion assembly being located on each side of the bucket. A lower hoist chain 20 connects each trunnion to spreader bar 18. An upper hoist chain 16 connects each side of the spreader bar to yoke 48.

The term "yoke" refers to the component that connects the upper hoist chains to the tensile members used to lift the entire bucket assembly. It is also typically used to connect the chains to the dump block assembly. It can take on many shapes and forms. In the example of FIG. 1, yoke 48 connects upper hoist chains 16 to a pair of lift ropes 14 (Each lift rope 14 is connected to a socket 12). In this context the term "rope" refers to any suitably flexible tensile member. A cable made of wrapped steel wires is often used as a lift rope.

The yoke may be a single large casting or it may be an assembly of several pieces. The term should be broadly construed to mean anything that connects the bucket assembly rigging to the lifting cable(s) leading to the boom on the crane.

As stated previously, the lift ropes connect the bucket assembly to the boom of the crane. Yoke 48 also provides an attachment point for dump block 28. As the name suggests, a mechanism incorporating the dump block is used to change the bucket from its scooping configuration to its dumping configuration. When this mechanism is actuated, the bucket pivots downward about the two trunnion assemblies. The mouth of the bucket pitches downward and the tail of the bucket rises. Once the bucket's contents are completely dumped, the dumping mechanism is reversed and the bucket is returned to its digging orientation.

Still referring to FIG. 1, one or more drag lines 36 are attached to the rigging shown via drag socket 34. A drag line(s) is used to pull the bucket toward the crane once the bucket has been dropped into the material. A drag line is also commonly used to regulate the bucket's orientation. Drag chains 30 connect drag socket 34 to the sides of the bucket. The drag chains attach to bucket 24 on either side of the bucket's mouth. Arch 32 is typically provided to reinforce the bucket's open mouth.

The reader will note that a dump rope 26 passes from the drag socket 34, around dump block 28 and connects to the upper portion of arch 32. The dump rope is used to regulate the transition of the bucket between its digging and dumping orientations.

FIG. 2 shows the same assembly from a different vantage point. The reader will note that each drag chain is attached to the bucket using a large and robust drag chain hitch 40. The lifting chains may be divided into two categories: Lower hoist assembly 44 includes the two lifting chains connecting the trunnions to the spreader bar. The spreader bar itself may also be considered part of the lower hoist assembly. Upper hoist assembly 42 includes the lifting chains used to connect the spreader bar to the yoke. Top rail 38 extends around the top of the open bucket.

The bucket assembly is operated in a brutal environment. The bucket is typically dropped into an ore deposit containing rocks and other abrasive materials. Chains have traditionally been used near the bucket itself because of the extreme forces applied and the abrasive action of the material being dug. The chains shown m the assembly may be comparable in size to the anchor chains used on a large ship. For example, each link may be well in excess of 1 foot (30+centimeters) long.

Such chains are quite heavy. They must be serviced and replaced often as well. The size and weight of the chains make them difficult and dangerous to handle. In addition, the chains rapidly elongate while in use—primarily because of link-to-link abrasion. This elongation alters the dumping geometry of the bucket assembly and reduces its performance. In addition, the elongation of the lifting chains reduces the maximum height to which the bucket assembly may be lifted. The reduction in lift height reduces the amount of material that the drag-line assembly can move. It would be advantageous to replace the chains with a lighter and less cumbersome material. It would also be advantageous to replace the chains with a tensile member that does not elongate significantly. More information regarding the structure and operation of dragline bucket assemblies is provided in my own co-pending patent application Ser. No. 15/066,162, which is hereby incorporated by reference.

FIG. 3 sows the boom and bucket assembly for a prior art power shovel 118. Boom 120 mounts a pair of dipper arms 122 on either side. The two dipper arms are connected, to bucket 124. Bucket 124 includes a floor 126 that may be selectively opened to dump its contents. A power shovel digs by using the clipper arms to scoop the bucket forward, and upward in the same manner as an old-fashioned steam shovel. The boom then swings to place the bucket over another position. The bucket's contents are then dumped by opening floor 126.

Boom 120 is raised and lowered using boom ropes 134. The boom is ordinarily not raised or lowered frequently, however. Most of the digging is done by raising and lowering dip arms 122. These are raised and lowered by reeling in and paying off dipper ropes 132. Each of the dipper ropes is attached to yoke 128 by passing a loop 136 through passage 140 and securing a dipper rope back to itself with a collar 138. This is not the only known way to attach the dipper ropes to the bucket but it is a common way. Yoke 128 is connected to the bucket via a pair of trunnions 130 (one on either side).

Steel chains and cables are typically used for both dragline and power shovel operations. Steel provides toughness in such a hostile environment, where dust, abrasion, and substantial impacts are common. Synthetic filament cables would provide a substantial weight savings over steel. These include cables made of DYNEEMA, SPECTRA, TECHNORA, TWARON, KEVLAR, VECTRAN, PBO, carbon fiber, and glass fiber (among many others). In general the individual filaments have a thickness that is less than that of human hair. The filaments are very strong in tension, but they are not very rigid. They also tend to have low surface friction. These facts make such synthetic filaments difficult to handle during the process of adding a termination and difficult to organize.

Hybrid cable designs are also emerging in which traditional materials are combined with high-strength synthetic materials. These present additional challenges, since the metal portions may be quite stiff while the synthetic portions will not be.

The present invention provides an armored cable construction permitting synthetic filament (and potentially hybrid) cables to be used in hostile working environments such as dragline and power shovel operations.

BRIEF SUMMARY OF THE PRESENT INVENTION

The present invention comprises a novel cable construction provided an armored covering over a cable containing high-strength synthetic filaments. The synthetic cable is provided with a strong and tough termination where it attaches to the prior art dragline or power shovel digging equipment. An external armoring is then provided from the termination for a specified distance up the cable. The armoring ceases prior to the point where the cable passes over a pulley. At that point the cable just carries a conventional encapsulating jacket. A collar is preferably provided to seal the end of the armoring portion to the jacket.

Figure 1:
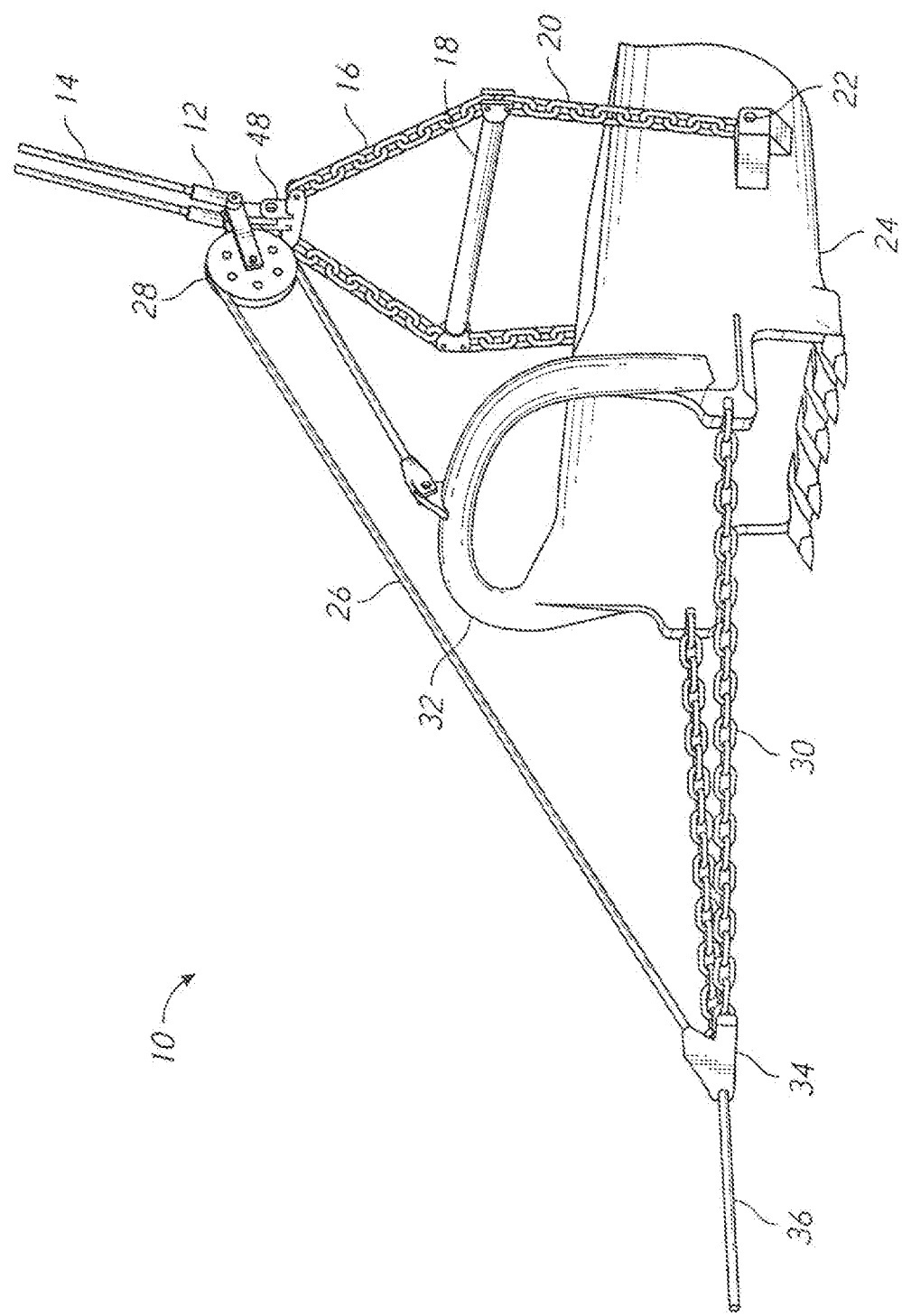
FIG. 1 is a perspective view showing a prior art dragline bucket and its associated lifting and dumping rigging.
Figure 2:
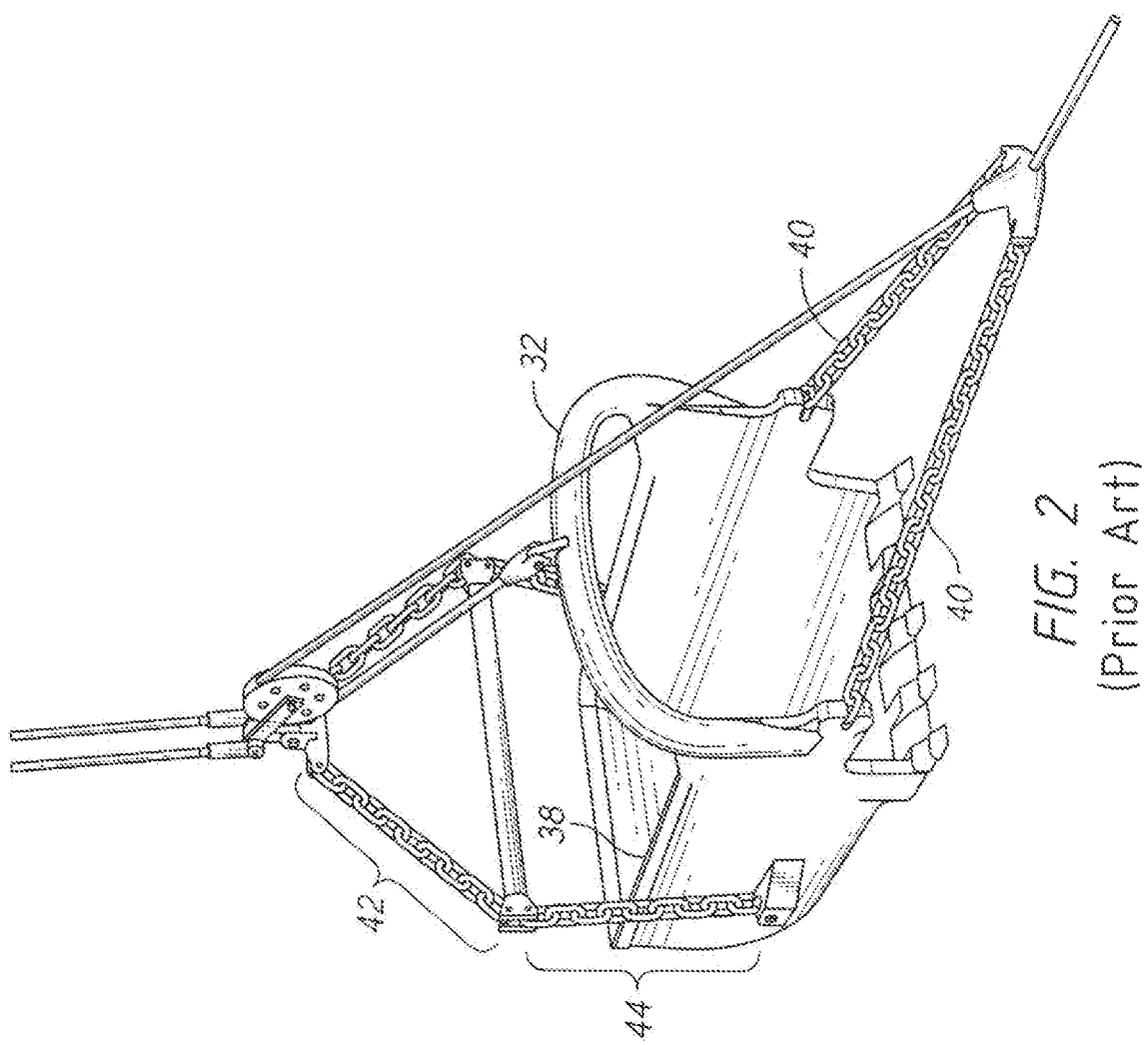
FIG. 2 is a perspective view, showing the assembly of FIG. 1 from a different vantage point.
Figure 3:
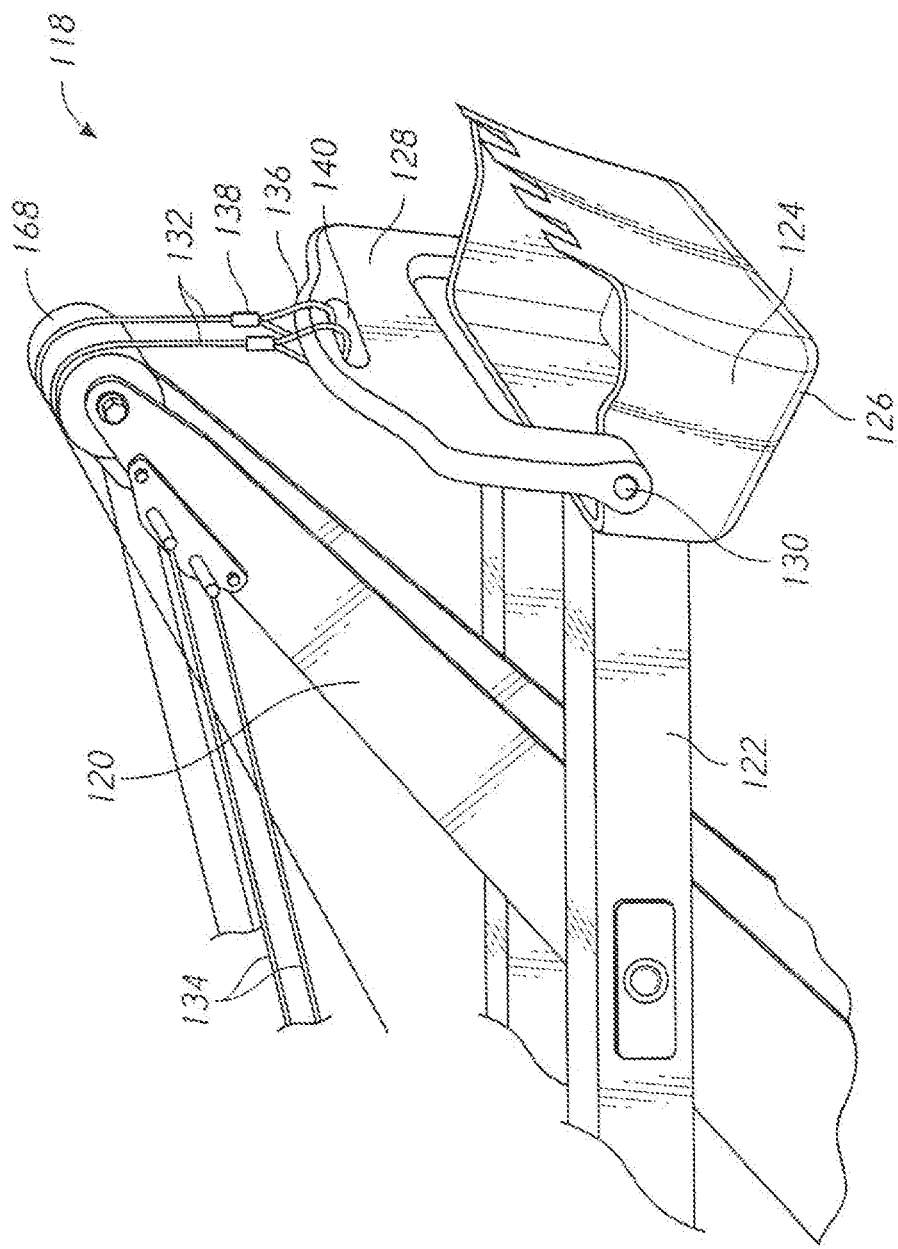
FIG. 3 is a perspective view, showing a prior art power shovel.

REFERENCE NUMERALS IN THE DRAWINGS 10 dragline bucket assembly
12 hoist socket
14 lift rope
16 upper hoist chain
18 spreader bar
20 lower hoist chain
22 lift trunnion
24 bucket
26 dump rope
28 dump block
30 drag chain
32 arch
34 drag socket
36 dragline
38 top rail
40 drag chain hitch
42 upper hoist assembly
44 lower hoist assembly
118 power shovel
120 boom
122 dipper arm
124 bucket
126 floor
128 yoke
130 trunnion
132 dipper rope
134 boom rope
136 loop
138 collar
140 passage
142 termination
144 attachment fixture
146 cable armoring
148 collar
150 jacketed cable
152 cavity
154 potted region
156 interlock
158 interlock
159 O-ring
160 stranded core
162 jacket
164 gap 165 strap
168 lifting block

DETAILED DESCRIPTION OF THE INVENTION

Figure 4:
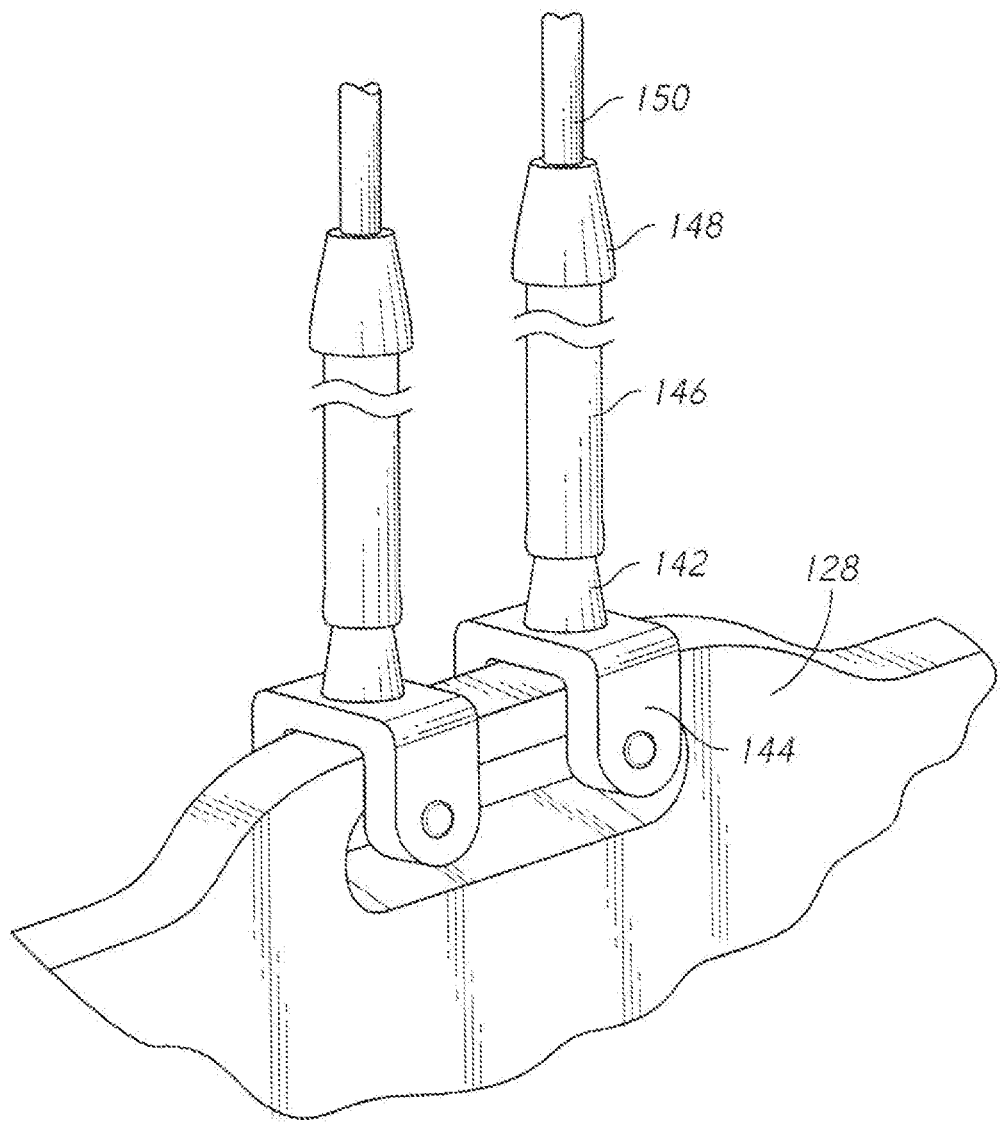
FIG. 4 is a detailed perspective view, showing an exemplary attachment between a cable made according to the present invention and a prior art yoke.

FIG. 4 shows one approach to using a synthetic cable for the rigging on a dragline or a power shovel. FIG. 4 shows the example of a power shovel. Jacketed cables 150 each include a synthetic filament core surrounded by an encapsulating jacket. The jacket organizes the cable and provides protection from external contaminants and from sunlight. However, it is not nearly durable enough to withstand the harsh environment near the bucket on its own. Cable armoring 146 is added in near the bucket. This armoring extends up the cable until it reaches a portion of the cable which must pass over lifting block 168. Each cable passes over the lifting block as the bucket is raised and lowered. When the bucket is raised to its maximum height, the armoring should stop just short of the lifting block.

In this example each cable is terminated into a heavy steel piece (attachment fixture 144). This creates a suitable termination 142 on the end of each cable. Each attachment fixture 144 is made of steel and is quite durable. These are connected to yoke 128 using steel pins. Cable armoring 146 covers and protects the jacketed cables 150 from the point each cable emerges from its respective termination up to a collar 148.

Collar 148 provides a protective seal between the jacketed cable and its cable armoring. It prevents the ingress of dust, fine debris, liquids, and other contaminants. The collar may be of a split configuration that is clamped in place using transverse bolts.

Figure 5:
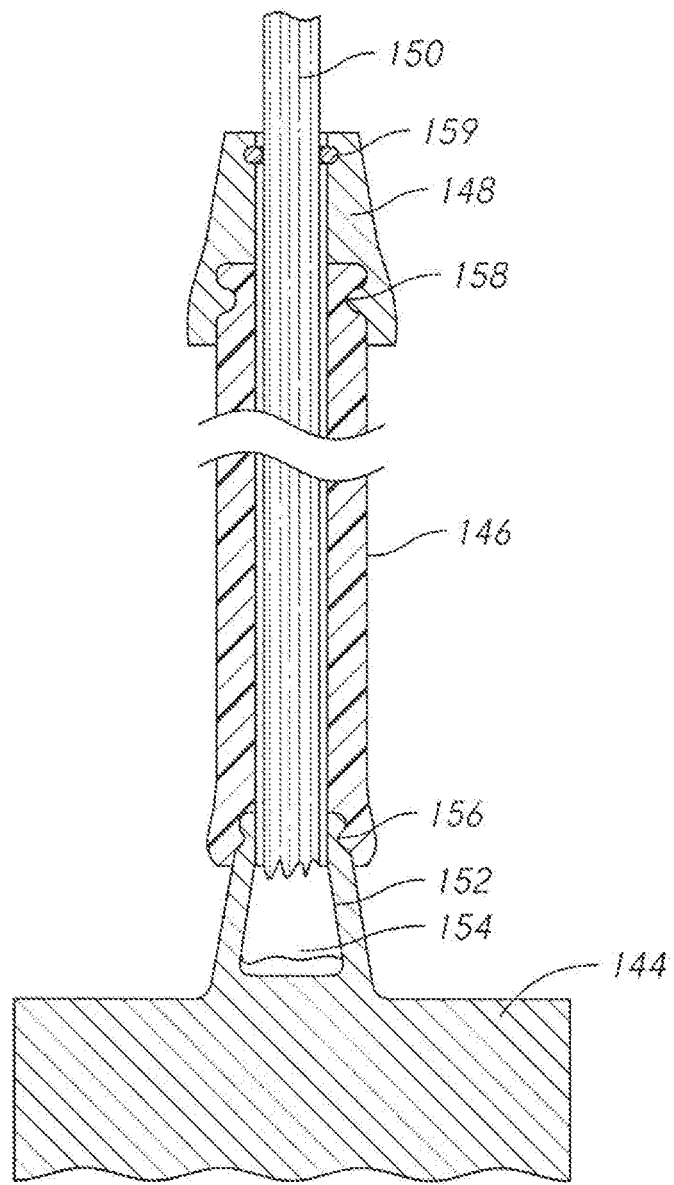
FIG. 5 is a sectional elevation view, showing an armored synthetic cable according to the present invention.

FIG. 5 shows a sectional elevation view through one cable assembly. In this version attachment fixture 144 includes a cavity 152. A length of cable filaments are potted into this cavity to form potted region 154. This creates a mechanical interlock between the end of jacketed cable 150 and attachment fixture 144.

A single potted region is shown. In reality, multiple potted connections may be made between individual filament groupings and attachment fixture 144. This type of design is described in detail in my co-pending U.S. application Ser. No. 14/693,811, which is hereby incorporated by reference.

Cable armoring 146 is added over the outside perimeter of jacketed cable 150. The cable armoring is preferably a very tough and cut-resistant material. A good example is fiber-reinforced rubber. Interlock 156 is provided between the lower end of the cable armoring and the attachment fixture. Interlock 158 is also provided between the upper end of the cable armoring and the lower end of collar 148.

Collar 148 seals around the jacketed cable. O-ring 159 is preferably provided to make a positive seal between the collar and jacketed cable 150. This prevents the ingress of dust, water, and other contaminants. Although no gap is shown between the exterior of the jacket and the interior of the cable armoring a significant gap may in fact be present in many applications. In those instances it may be necessary to connect the armoring to the attachment fixture using a split clamping ring attached by transverse bolts. A second split clamping ring may be used at the top of the cable armoring as well.

Figure 6:
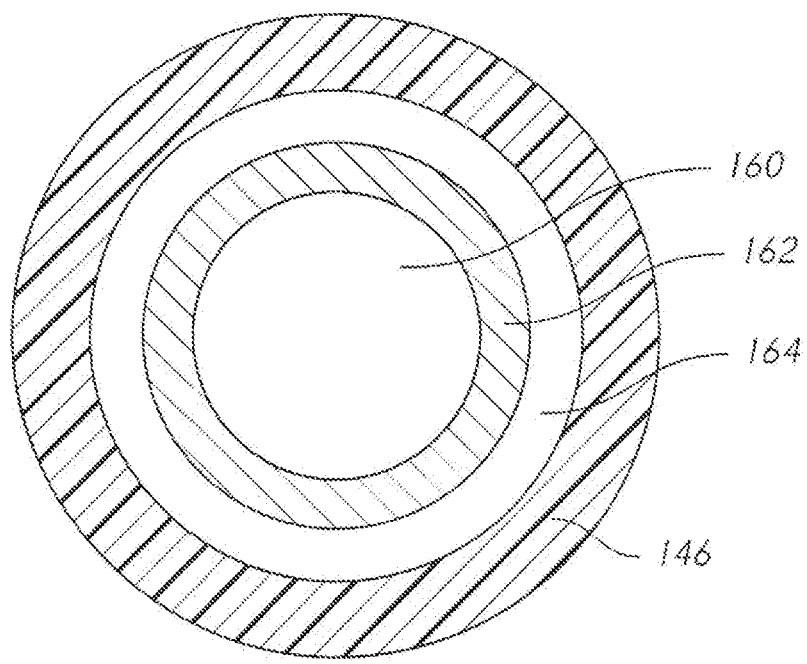
FIG. 6 is a sectional plan view of the cable of FIG. 5.

FIG. 6 shows a cross-section through a jacketed cable with an armoring layer added. Stranded cores 160 comprises the high-strength synthetic filaments (some conventional steel wires may also be included). Jacket 162 fits tightly around this core. Cable armoring 146 is a thick and tough layer. As stated previously, it may be made of a natural or synthetic rubber reinforced by another material such as steel wires or fiberglass. Gap 146 is provided between the interior of the cable armoring and the exterior of the jacket in this example. This gap allows the cable to bend and flex without chafing against the interior of the armor layer. The gap may be filled by another material such as a woven cloth layer.

Figure 7:
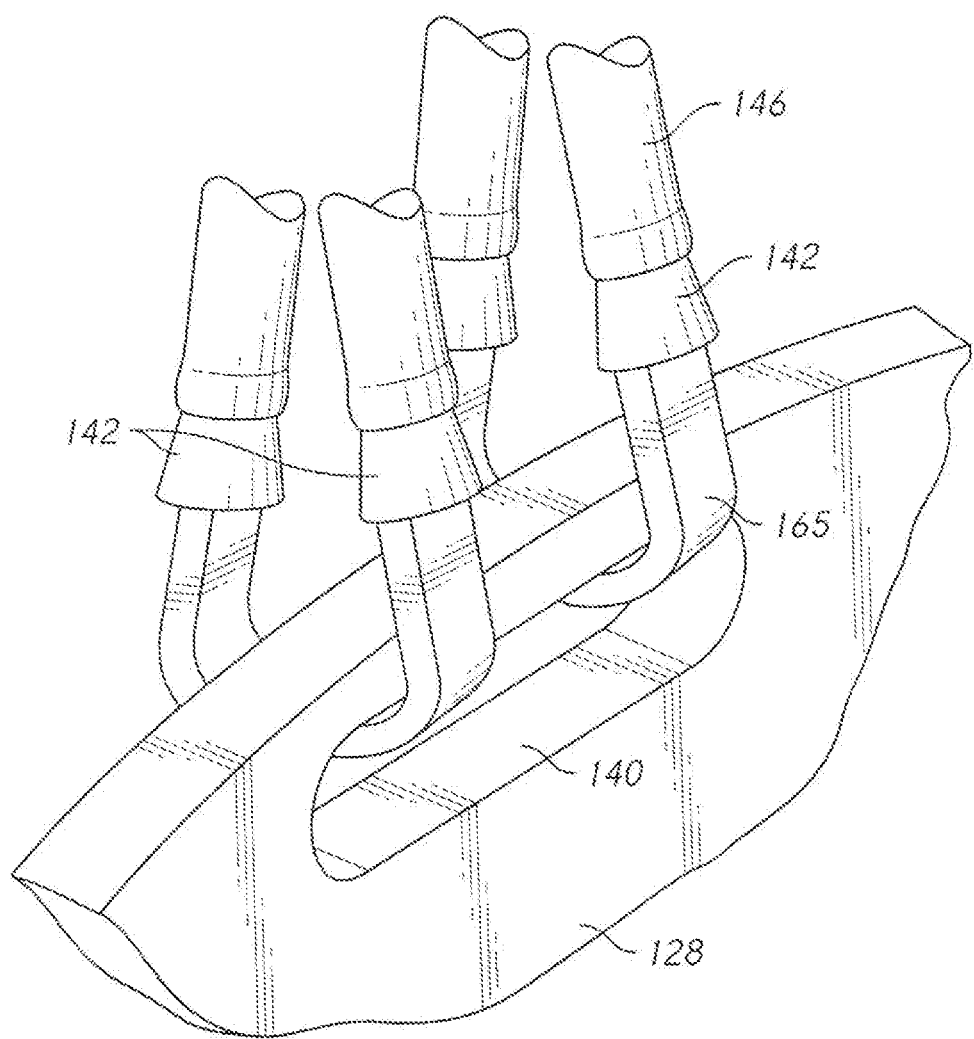
FIG. 7 is a perspective view, showing an alternate method of attaching an inventive cable to a prior art yoke.

FIG. 7 shows an alternate embodiment for attaching the inventive cable to yoke 128 of a power shovel. In this instance four separate synthetic cables are used. Each pair of synthetic cables is terminated to a steel strap 165. The steel strap passes through passage 140 to connect to the yoke and thereby connect to the bucket assembly.

In the context of this disclosure the term "lifting machine" shall be used to encompass boom cranes, power shovels, and similar machinery where a cable is used to raise and lower a bucket.

Although the preceding description contains significant detail, it should not be construed as limiting the scope of the invention but rather as providing illustrations of the preferred embodiments of the invention. Those skilled in the art will be able to devise many other embodiments that carry out the present invention. Thus, the language used in the claims shall define the invention rather than the specific embodiments provided.

Having described my invention, I claim:

1. An armored lifting cable system for use on a lifting machine having a tension-carrying drum, a boom, a lifting block on said boom, and a bucket suspended from said boom, comprising:
   a. an attachment fixture linked to said bucket;
   b. a synthetic filament core having a first end and a second end, with said first end being attached to said attachment fixture and with said core passing over said lifting block and around said tension-carrying drum;
   c. a jacket surrounding said core;
   d. a cable armoring layer having a lower end and an upper end, said cable armoring layer surrounding said jacket in a region proximate said bucket;
   e. said lower end of said cable armoring layer being connected to said attachment fixture by a first interlock;
   f. a collar attached to said jacket and said cable armoring layer proximate said upper end of said cable armoring layer;
   g. said collar surrounding said jacket and overlapping said upper end of said armor layer;
   h. a positive seal between said collar and said jacket configured to prevent an ingress of contaminants; and
   i. said second end of said cable armoring layer being connected to said collar by a second interlock.

2. An armored lifting cable system as recited in claim 1, wherein:
   a. said bucket has a maximum raised position; and
   b. a length of said cable armoring layer is selected so that said collar remains below said lifting block when said bucket is raised to said maximum lifting position.

3. An armored lifting cable system as recited in claim 1 further comprising a gap between said jacket and said cable armoring layer, wherein said gap is sufficient to allow said armored lifting cable system to bend without chafing existing between said jacket and said cable armoring layer.

4. An armored lifting cable system as recited in claim 1, wherein said cable armoring layer is made of fiber-reinforced rubber.

5. An armored lifting cable system as recited in claim 2, wherein said cable armoring layer is made of fiber-reinforced rubber.

6. An armored lifting cable system as recited in claim 3, wherein said cable armoring layer is made of fiber-reinforced rubber.

7. An armored lifting cable system as recited in claim 1, wherein:
   a. said first interlock comprises an annular groove in said attachment fixture engaged by a protrusion in said cable armoring layer; and
   b. said second interlock comprises an annular groove in said cable armoring layer engaged by a protrusion in said collar.

\* \* \* \* \*